United States Patent [19]
Becker et al.

[11] Patent Number: 5,612,975
[45] Date of Patent: Mar. 18, 1997

[54] DIGITAL RECEIVER FOR VARIABLE DATA RATE COMMUNICATIONS

[75] Inventors: Donald W. Becker, Encinitas; Thomas R. Bilotta, Escondido, both of Calif.

[73] Assignee: TV/COM Technologies, Inc., San Diego, Calif.

[21] Appl. No.: 260,889

[22] Filed: Jun. 16, 1994

Related U.S. Application Data

[63] Continuation-in-part of Ser. No. 68,560, May 28, 1993, Pat. No. 5,504,785.

[51] Int. Cl.$^6$ .................................................. H04L 25/06
[52] U.S. Cl. .......................... 375/319; 375/235; 375/327; 375/343; 375/349; 375/350; 455/307; 455/337; 364/724.11; 341/61; 329/308
[58] Field of Search ..................................... 375/229, 230, 375/232, 207, 260, 235, 317, 319, 324, 326, 327, 328, 329, 340, 343, 344, 349, 350, 376; 364/724.11, 724.01, 724.1, 724.19, 724.2; 348/572, 574, 441; 329/308, 304, 318; 455/214, 307, 311, 337; 341/61

[56] References Cited

U.S. PATENT DOCUMENTS

| | | | |
|---|---|---|---|
| 4,725,972 | 2/1988 | Göckler | 364/724 |
| 4,878,029 | 10/1989 | Saulnier et al. | 329/341 |
| 5,274,372 | 12/1993 | Luthia et al. | 348/441 |
| 5,276,706 | 1/1994 | Critchlow | 375/343 |
| 5,309,482 | 5/1994 | Wright et al. | 375/350 |
| 5,425,057 | 6/1995 | Paff | 375/326 |
| 5,432,813 | 7/1995 | Barham et al. | 375/207 |
| 5,500,874 | 3/1996 | Terrell | 375/350 |

*Primary Examiner*—Stephen Chin
*Assistant Examiner*—Amanda T. Le
*Attorney, Agent, or Firm*—Baker, Maxham, Jester & Meador

[57] ABSTRACT

A digital receiver includes a tuner and a demodulator that obtains a modulated signal carried in a received analog signal. A digital-to-analog converter operates at a preselected fixed sampling rate on the modulated signal to produce a first sequence of digitized samples. The first sequence of digitized samples is processed by a digital rotator to frequency-and phase-correct the first sequence of digitized samples. A controllable digital filter processes the first sequence to produce a filter output including a second sequence of digitized samples at a symbol rate. The second sequence is processed to ascertain a symbol rate of the modulated signal. The controllable filter coefficients are automatically varied to accommodate changes in the symbol rate of the modulated signal, so that the sampling rate of the digital-to-analog converter need not change. The second sequence is processed by post detection automatic gain control to produce a receiver output including a sequence of scaled and leveled digitized samples at the symbol rate.

21 Claims, 11 Drawing Sheets

DIGITAL RECEIVER FOR VARIABLE DATA RATE COMMUNICATIONS

This application is a continuation in part of Ser. No. 08/068,560 filed May 28, 1993, now U.S. Pat. No. 5,504,785.

BACKGROUND OF THE INVENTION

This application is a Continuation-in-Part of U.S. Patent Application Ser. No. 08/068,560, filed May 28, 1993, now U.S. Pat. No. 5,504,785 for "DIGITAL RECEIVER FOR VARIABLE DATA RATE COMMUNICATIONS", assigned to the assignee of this application.

This invention relates to the reception and detection of communications signals, and more particularly, to the reception of such signals transmitted with variable data rates.

In a communications system, data is formatted onto a carrier signal and transmitted by a transmitter. After the signal travels through some intervening medium, it is received and decoded by the receiver. Ideally, the waveform of the data would remain unchanged during the communications process. In practice, however, the waveform is distorted and corrupted by its passage both through the electronic circuitry of the transmitter and the receiver, and through the medium. An important feature of the receiver is the processing of the received signal to determine the actual content of the data even though the transmitting signal has become distorted and corrupted during the transmission and reception process.

For example, in a typical satellite communications system a data signal is created at one location on the earth, encoded onto a radio signal, and transmitted to a satellite in synchronous orbit above the earth. The satellite retransmits the received signal to another location on the earth, where it is received and demodulated. The data-carrying signal passes through several electronic systems, as much as 44,000 miles of free space, and twice through the atmosphere, and in all of these portions of the transmission it is subject to external interference and distortions.

Historically, the signal has been transmitted and processed entirely by analog techniques. More recently, digital signal processing techniques are being adopted because they permit more precise determination of the data content of the signal. In digital signal processing, the receiver has a conventional analog tuner that receives and shifts the signal to a lower frequency. The receiver thereafter samples the received analog signal to form a digital pulse train or signal. The digitized signal is further processed to extract the data content.

This known approach works well for the condition that the transmitted signal has a fixed data rate known to the receiver, which permits the receiver to be configured for the characteristics of the known transmitted signal. In other instances, however, it is desirable to vary the data rate of the transmitter for various reasons. For example, a single satellite channel may be used to carry many different types of data signals, some of which are transmitted at a high data rate and some of which are transmitted at a low data rate. In another example, if the satellite channel carries a compressed video signal, it may be desirable to vary the data rate depending upon the type of programming being carried. A video feed of a conference could be transmitted at a lower data rate than a video feed of a sports event, for example, due to the differences in the speed of the action.

Several problems arise in complex communications systems having multiple channels, where the data rate is variable in each channel. As the data rate of the signal in a channel changes, the sampling rate of the sampler in the receiver must change in order to satisfy the Nyquist sampling criterion. The sampler is normally synchronized to the data rate, and its sampling rate changes to track changes in the data rate. However, for other reasons it is strongly preferred not to change the sampling rate in an arbitrary fashion so as to accommodate changes in the data rate. A second problem is that it is difficult to achieve initial acquisition of the data of the received information, when the channel is first activated.

There is a need for a digital receiver system that is operable at variable rates, particularly in a multichannel communications system. The present invention fulfills this need, and further provides related advantages.

SUMMARY OF THE INVENTION

The present invention provides a digital receiver that accommodates variable symbol rates in digital signal processing while performing detection that includes sampling at a fixed sample clock rate.

In accordance with the invention, a digital receiver is operable with a transmitted analog signal having an arbitrarily variable symbol rate. The digital receiver has a tuner receiving the transmitted analog signal as an input and providing a received analog signal as an output. A converter in the receiver mixes the received analog signal and outputs a modulated signal which may be at baseband or in a preferred passband. The modulated signal is sampled at a fixed sample clock rate by an analog-to-digital converter that produces a sampled modulated signal including a first sequence of digitized samples at the sample clock rate. For fine channel acquisition, the modulator includes a digital rotator that receives the first sequence of digitized samples and adjusts frequency and phase of the first sequence of digitized samples. The first sequence is provided as an input to a controllable digital filter that is adaptively configured by a filter configuration signal to produce an output of a second sequence of digitized samples at a symbol rate, wherein the output represents a symbol stream. Provision is made in the receiver to determine a symbol rate change and to change the filter configuration signal to represent the symbol rate change. Changing the filter configuration signal causes the controllable digital filter to adaptively reconfigure itself to accommodate the changed signal rate. The second sequence of digitized samples is received by a gain controller which produces a demodulator output including a scaled and leveled sequence of digitized samples at the symbol rate.

The present invention provides an important advance in the art of digital receivers. A modulated signal is sampled at a fixed sampling rate, and the sampled data are processed by a controllable digital filter whose characteristics are adjusted in response to a change in symbol rate.

Other features and advantages of the present invention will be apparent from the following more detailed description of two embodiments, taken in conjunction with the accompanying drawings, which illustrate, by way of example, the principles of the invention.

DETAILED DESCRIPTION OF THE INVENTION

System Environment

Figure 1:
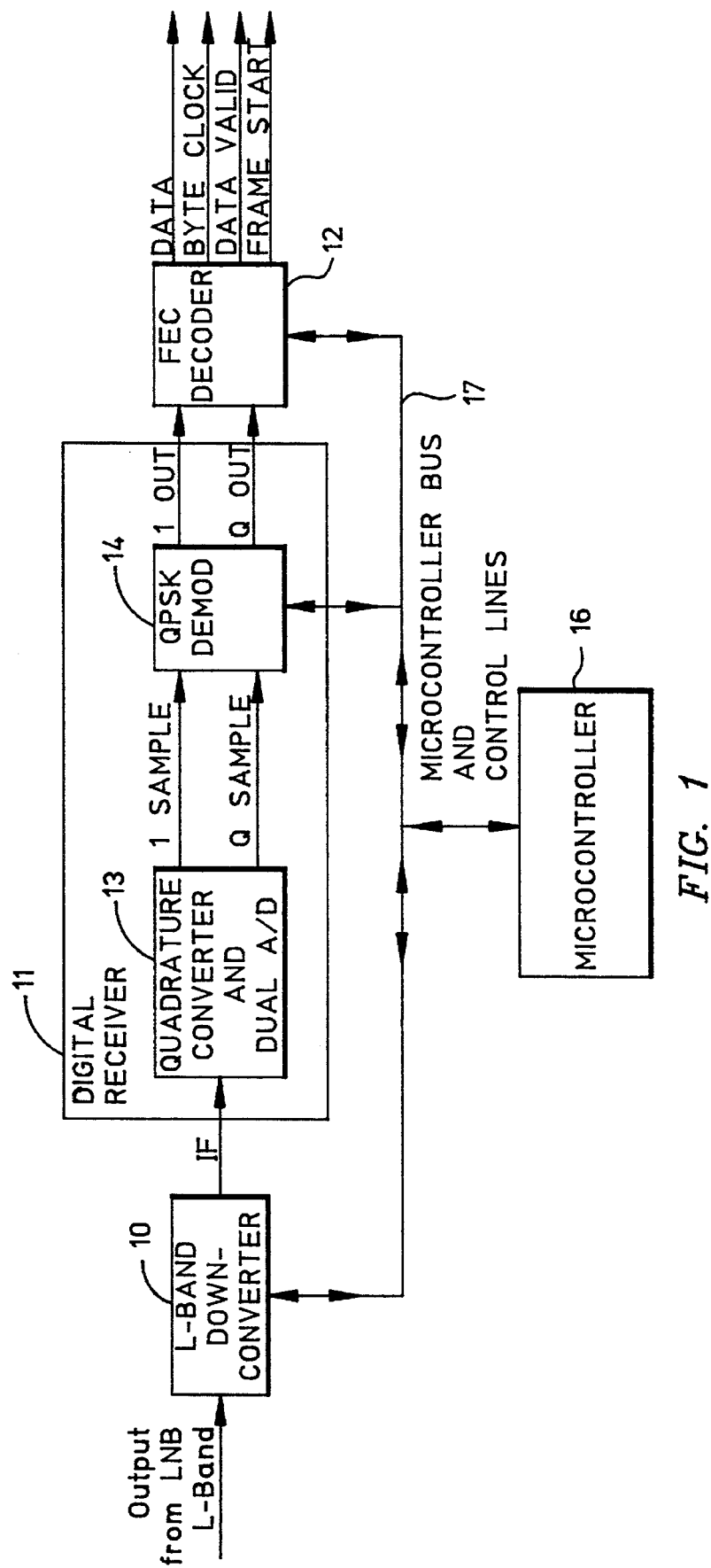
FIG. 1 is a block diagram of a receiver system including a receiver according to the invention.

FIG. 1 is functional block diagram of a receiver system in which the two embodiments of the invention are applied. The receiver system of FIG. 1 is, preferably, a satellite communications receiver. However, the invention may be practiced in many other receiver configurations that include land- and sea-based applications. Further, the receiver system of FIG. 1 presumes that a quadrature type of digital modulation has been employed; indeed, the specific embodiments of the invention refer specifically to the use of quadrature phase-shift keying (QPSK) modulation. However, the inventors contemplate that the principles found in this detailed description are applicable to many different kinds of digital modulation that may include, but are not limited to, phase, frequency, and amplitude-shift keying, continuous phase modulation, and various combinations thereof. Specific modulation techniques include, but are not limited to, QAM, VSB, and offset I and Q schemes such as OQPSK and MSK.

The receiver system of FIG. 1 receives an L-band RF carrier which is down-converted by an L-band downconverter 10 that produces an IF signal and provides it to a digital receiver 11. The digital receiver 11 implements either of the embodiments described in this application; it includes a downconverter 13 and a demodulator 14. The quadrature downconverter 13 converts the IF signal to a signal that is near a baseband frequency and that includes I and Q components. The quadrature downconverter 13 digitizes the I and Q components, producing a sampled baseband signal including a complex sequence of digitized samples that include I samples on an I channel and Q samples in a Q channel. The complex sequence of digitized samples is demodulated by the demodulator 14, which may be, for example, a QPSK demodulator which processes the I and Q channels into a complex sequence of digitized samples ($I_{out}$ and $Q_{out}$) that occur at a symbol rate. In this regard, each complex sample includes in-phase and quadrature-phase (I and Q) components that represent a symbol. Complex samples are gain-adjusted and output by the demodulator 14 to a decoder 12 such as a forward error correction (FEC) decoder. The decoder 12 may include for example a Viterbi decoder (or equivalent) concatenated with a Reed-Solomon decoder for performance of maximum likelihood soft-decision decoding, followed by forward error correction decoding. The decoder 12 outputs decoded data and various control signals including a byte clock, a signal indicating that the data is valid, and a signal indicating the start of a data frame. A micro-controller 16 that can comprise any of a plurality of programmable processors is connected by micro-controller bus 19a to the down converter 10, the demodulator 14, and the decoder 12. The micro-controller 17 executes a receiver system application program including an acquisition process with coarse and fine portions that implement control of the down converter 10, the demodulator 14, and the decoder 12 by setting parametric values that are input to these units.

Those skilled in the art will realize that sampling can include direct sampling of the IF signal with a single sampler, producing a single stream of samples that can be processed according to known techniques to produce I and Q channels.

Receiver First Embodiment

Figure 2:
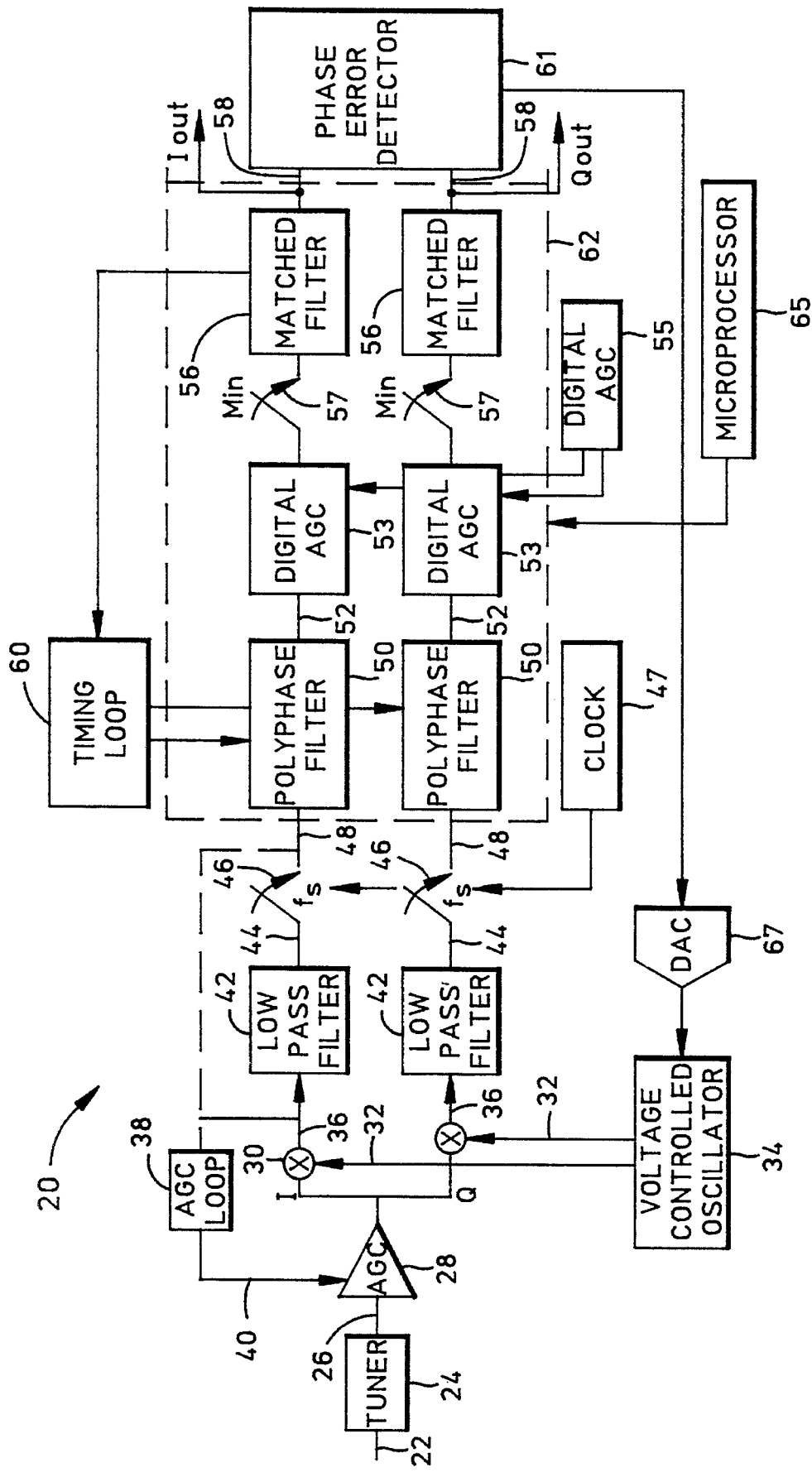
FIG. 2 is a block diagram of a first embodiment of the receiver of FIG. 1.

FIG. 2 is a block diagram of a first embodiment digital receiver 20. A transmitted analog signal 22 is received by a conventional tuner 24 appropriate for the band of the signal 22. A received analog output signal 26 of the tuner 24 is amplified by a variable-gain amplifier 28 to an amplitude suitable for subsequent signal processing.

The I/Q components of the received analog signal 26 are separately processed in parallel, as shown in FIG. 2. The processing is the same in each parallel path, and the following description applies to each of the paths.

The amplified received analog signal 26 is provided to a detector/mixer 30 as a first input. A second input is an internally generated local oscillator (mixer) waveform 32 provided by a voltage-controlled oscillator 34. The output of the detector/mixer 30 is a baseband signal 36 that contains the transmitted information, in this case a stream of digital waveforms.

The baseband signal strength of one of the I/Q components of the processing path is sampled at this point by an automatic gain control loop 38. The AGC loop 38 provides a feedback amplitude control signal 40 to the variable-gain amplifier 28. The gain of the amplifier 28 is adjusted to provide the required baseband signal strength for further processing.

The baseband signal 36, still in analog form, is filtered by a low-pass filter 42 that acts as an anti-aliasing filter for the subsequent digital sampling and processing. The bandwidth and out-of-band attenuation of this filter 42 are selected to avoid spectral aliasing and spectral distortion of the out-of-band and in-band components, respectively, of the maximum bandwidth signal presented to the sampler. In the preferred embodiment, subsequent digital sampling is at a fixed rate of 60 MHz, and the low-pass filter 42 is therefore selected to have a maximum bandpass of 15–30 MHz, preferably 20 MHz. Data transmissions are therefore necessarily at a rate of 30 MHz or less per I/Q channel with this preferred embodiment. A higher sampling rate would permit a higher maximum data transmission rate. These values are presented by way of illustration for a preferred embodiment, but other data rate modes can be selected as desired.

The filtered signal 44 is digitally sampled by a first sampler 46, preferably provided in the form of an analog-to-digital converter. The first sampler 46 is operated at a fixed, asynchronous sampling rate determined from a clock 47. The sampling is asynchronous in the sense that the sampling rate is fixed and constant. There is no relation between the sampling rate and the symbol rate or frequency of the baseband signal, except that the sampling rate is sufficiently high that the conditions of the Nyquist sampling criterion are necessarily met for the highest frequency signal available to the receiver. Satisfaction of the sampling criterion is ensured by the selection of the bandpass frequency of the low-pass filter 42 in relation to the operating frequency of the first sampler 46. There may be more than two samples per symbol, when the symbol rate is less than the maximum permitted symbol rate.

This approach to the selection of the first sampler 46 is distinct from that of the art. In prior approaches, the digital sampler was operated at a variable rate to exactly satisfy the Nyquist sampling criterion for the symbol rate of the baseband signal. This approach requires multiple clocks for multiple channels, and multiple low-pass filters. There would be no universal clock, a significant disadvantage for a multichannel communication system.

The combination of the low-pass filter 42 and the first sampler 46 defines a maximum frequency for a particular mode of operation of the receiver 20. Different selectable sets of fixed-rate digital samplers 46 and low-pass filters 42 can be used together to achieve various modes of operation, but within any particular mode the operation of the sampler 46 remains at a fixed asynchronous rate. Alternatively, a single reconfigurable fixed rate digital sampler and reconfigurable low-pass filter can be used to achieve various modes of operation.

Figure 3:
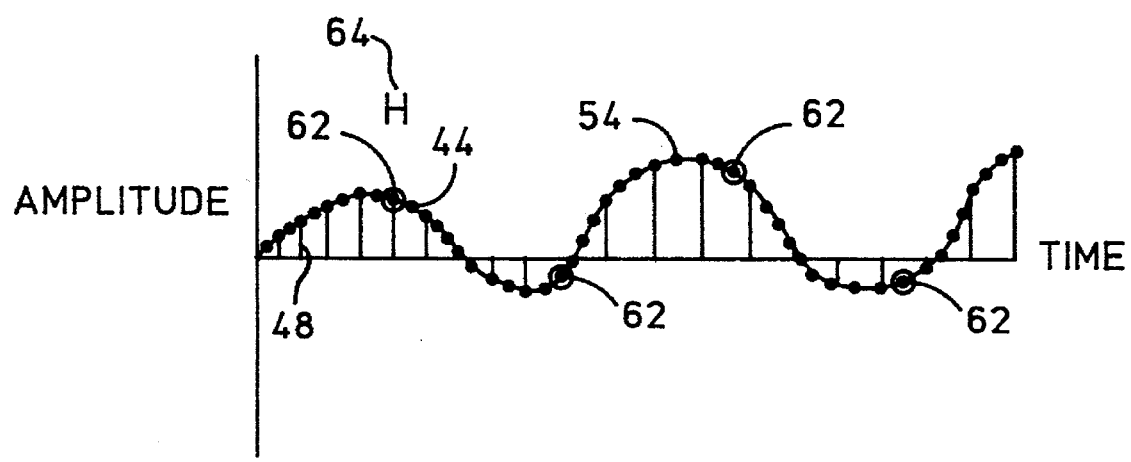
FIG. 3 is a graph of a representation of a baseband signal, with indicated sampling.

Referring again to FIG. 2, the first sampler produces a digital first sampler output 48. FIG. 3 depicts the analog baseband signal 44 in the time domain with the digital first sampler output 48 also indicated. There are necessarily at least two samples 48 per symbol. However, these samples 48 do not bear any fixed, known relation to the baseband signal 44. Specifically, the asynchronous samples 48 are not taken in a particular time position relation with the symbols transmitted or in any other relation to the symbols that is known a priori.

The first sampler output 48 is resampled by a controllable digital filter 50. The filter 50 is preferably a multirate polyphase filter capable of either rational resampling or interpolation and decimation according to some ratio of integers A/B, or a variable rate polyphase filter capable of a continuously variable resampling at any continuous interpolation and/or decimation. The filter 50 performs two key functions. It produces an output of a controllable digital resampled signal 52 that has twice the frequency of the symbol data rate of the baseband signal 36, to satisfy the Nyquist sampling criterion. Second, it ensures that the digital resampled signal 52 is time position locked to the baseband signal 36 so that the samples are taken at the symbol locations of the signal 36.

The basic structure and operation of polyphase filters is known, see, for example, Ronald E. Crochiere et al., "Multirate Digital Signal Processing", Prentice-Hall Company, pages 59 et seq., 1983, whose disclosure is incorporated by reference. By a combination of decimation and interpolation, such filters can produce a digital sampling of an input signal at any selected rate. In this case, the input is the digital first sampler signal 48 having a frequency at least as high as twice the symbol rate of the baseband signal. The filter 50 therefore functions to produce the same or a lower effective sampling rate, time position locked to the timing of the digital first sampler signal 48.

As indicated in FIG. 3, the filter 50 operates by increasing the sampling rate to a higher value than that of the first sampler 46 to interpolate between the digital samples 48, producing a plurality of interpolated samples 54. The larger number of interpolated samples 54 is decimated by selecting the proper number and positions of samples to correspond to the symbol rate of the baseband signal.

Figure 4:
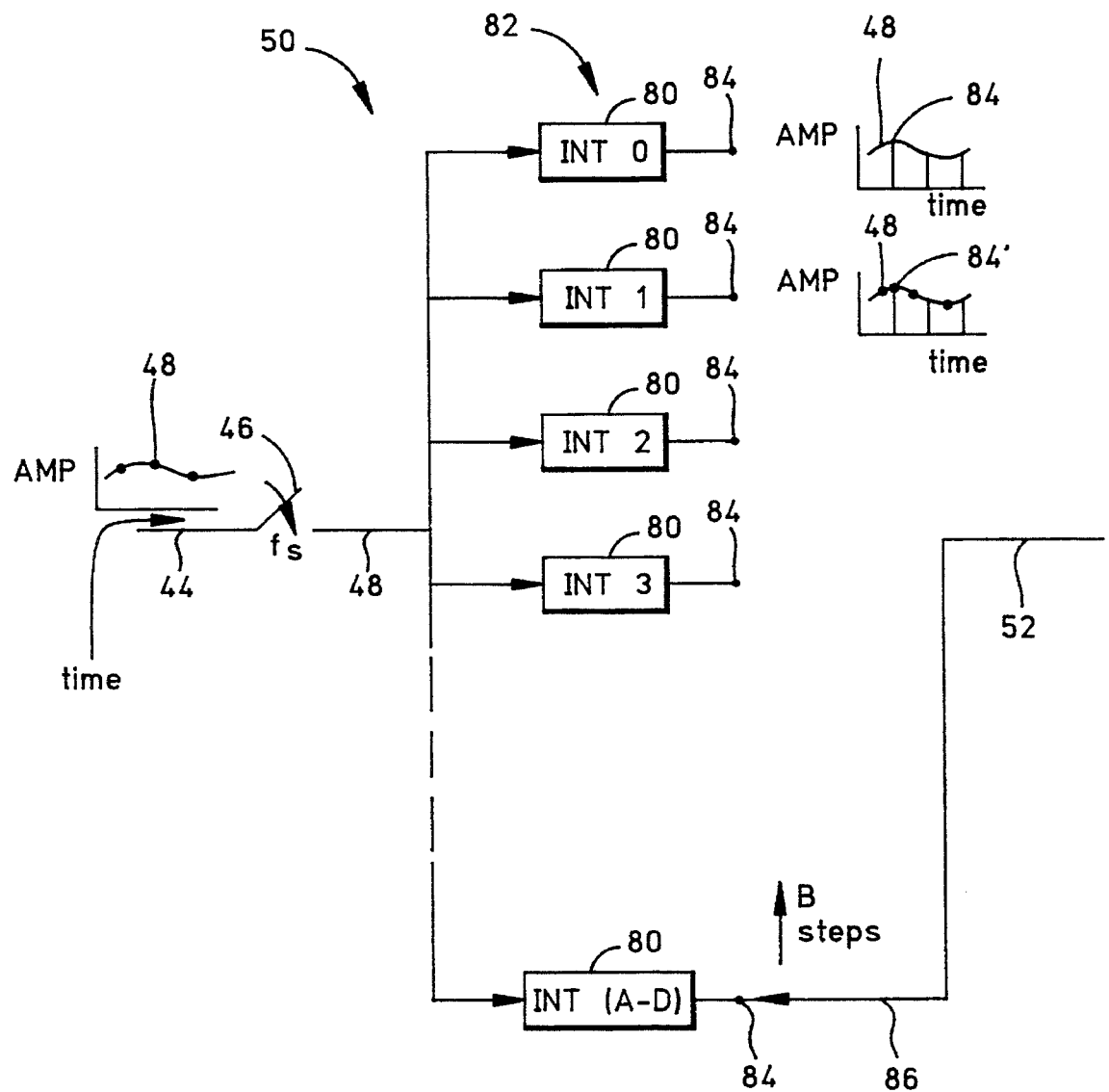
FIG. 4 is a schematic diagram of a polyphase filter in the first embodiment.

FIG. 4 schematically illustrates the operation of the polyphase filter 50. The relation of sampled and resampled signals is indicated graphically. The digital first sampler output stream 48 is supplied to each input of a plurality of A interpolators 80 of a polyphase filter bank 82. Each interpolator interpolates between the points of the output stream 48 at the same constant frequency $f_s$, the same rate as the first sampler 46, to produce its own interpolator output 84. Two of the interpolator outputs 84 and 84' are shown, for the first interpolator (INT0) and the second interpolator (INT1). The interpolator outputs 84 and 84' are at the same frequency $f_s$, but time displaced from each other. By the appropriate choice of the time displacements according to the number of interpolators 80 in the filter bank 82, the filter bank 82 produces A upsampled interpolation points between each of the digital first sampler points 48.

A commutator 86 operates on the interpolator outputs 84 to downsample or decimate the outputs 84 by a downsampling parameter B. If the downsampling parameter B is made equal to the upsampling parameter A, the filter bank 82 operates as a time-shifting or phasing filter. Time increment quantization is defined by the number of polyphase filter stages, and can be made arbitrarily fine by increasing A. In this mode, the filter bank can align output samples from the asynchronously sampled input stream 48 to arbitrary epochs in the input data. If the frequency of the sampling clock $f_s$ used to form uniformly spaced samples and the frequency of periodic epochs $f_e$ in the underlying data differ by a small percentage the pointer of output commutator can precess in the appropriate direction to track the epochs. Thus, rather than increment the commutator 86 in equal steps of length A, the output pointer is instead incremented in steps of A for M−1 samples and then in steps of A±1 at the Mth sample, according to the relation $f_s/f_e=[(M-1)A+(A\pm1)]/M$.

When the output incrementing factor B is chosen to be different from the input incrementing factor A, an output sample rate with any rational ratio multiple of the input sample rate ($f_s A/B$) can be obtained. If the desired frequency is near a rational ratio, then it can be approximated with minor phase jitter by the same processing approach just described. For a sufficiently large A, the use of a processing B (e.g., B') permits the formation of time matched samples at any output rate.

The digital resampled signal 52 is amplified as necessary by a digital amplifier 53 controlled by a digital automatic gain control 55. The amplified signal is resampled at the minimum permitted Nyquist rate by a resampler 57, whose output is processed by a matched filter 56 referenced to the transmitter waveforms and bandwidth. An output 58 of the matched filter 56, a spectrally shaped bit stream synchronized to the original data stream that generated the baseband signal, is provided to further processing hardware, which is conventional.

The phase of the sampling of the controllable digital filter 50 is established in conjunction with the filter bank 82 discussed above, using a timing loop 60. The error between the reference signal of the matched filter 56 and the digital resampled signal is a measure of the time position shift required in the controllable digital filter 50 to recover the timing and align the digital samples with the symbols encoded into the baseband. Referring to FIG. 2, if the matched filter 56 indicates that the digital resampled signal points, indicated by circled pointer 62, is time position shifted from its respective symbol location by an error 64, the timing loop 60 shifts the time position of the resampling of the controllable digital filter 50 by interpolating to the desired positions, thereby reducing the error 64 to zero.

The phase error of the output signal I/Q pair 58 is detected by a phase error detector 61. This phase error is provided, via a digital/analog converter 67, to the voltage controlled oscillator 34, which generates the frequency and phase coherent mixer waveform 32.

The controllable digital filter 50 and the matched filter 56 together form a controllable signal processor 62. The filters 50 and 56 may be combined into a single polyphase filter.

In the preferred approach, the controllable signal processor 62 is controlled in part by the timing loop 60 and in part by a microprocessor 65. The controllable signal processor 62 also provides information to the microprocessor 65. The ability to control and interact with the controllable signal processor 62, which contains the controllable digital filter 50, provides great flexibility and power to the receiver 20.

Figure 5:
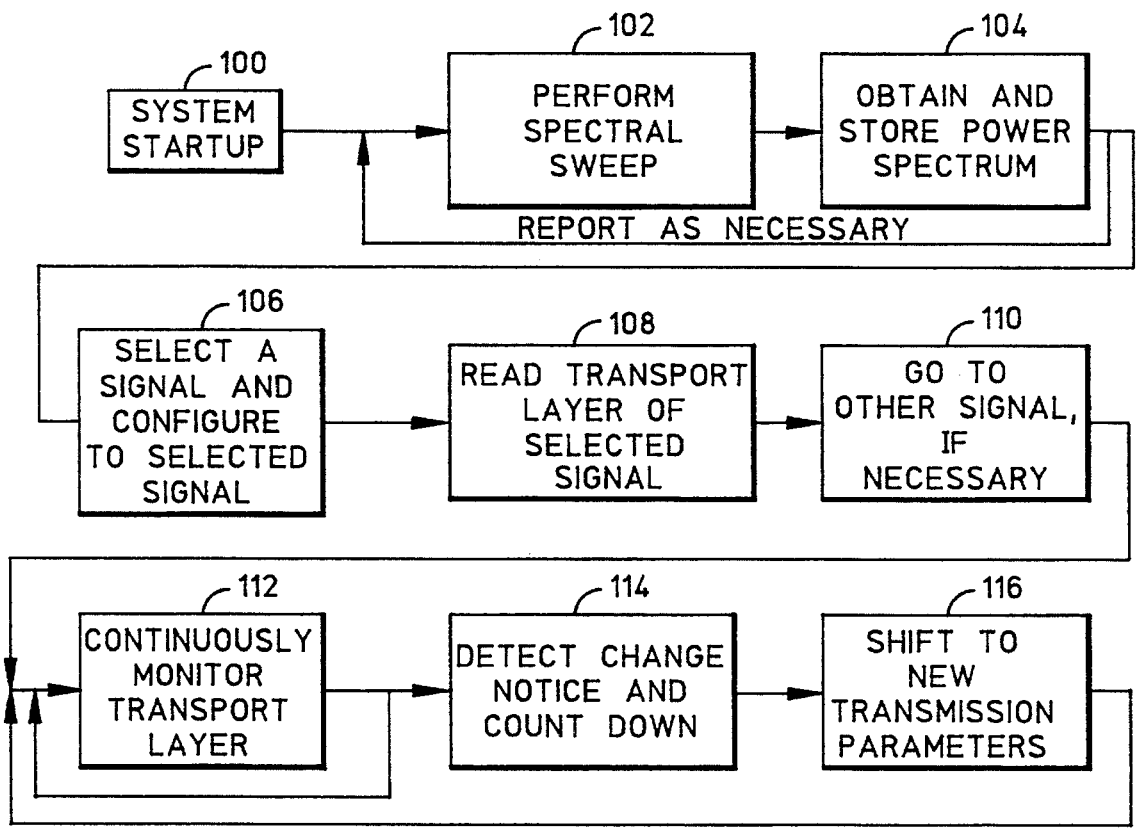
FIG. 5 is a block flow diagram for the acquisition of a signal upon startup of the receiver and the continuous monitoring of the signal for transmission changes during operation.

An important function of the microprocessor 65 is to support the initial signal acquisition by the receiver and to aid in making a seamless shift responsive to announced changes in the transmitted signal. FIG. 5 illustrates both of these processes, in the context of system startup and continued monitoring of the symbol bit stream.

At system startup, numeral 100, the center frequency and bandwidth must be assumed to be unknown, but within the general specifications of the hardware. By contrast, in most types of signal communications the center frequency and bandwidth of the signal are preselected, so that the receiver can be configured directly to those values upon startup. The present approach permits the greatest extent of flexibility for those using the communications system with the receiver 20 of the invention.

To locate the unknown center frequency and bandwidth, the microprocessor 65 causes the controllable signal processor 62 to act as a narrow bandwidth, swept frequency spectrum analyzer. The controllable digital filter 50 is operated as a narrow bandwidth filter, typically at about 2 MHz bandwidth. The center frequency received by the controllable digital filter 50 is shifted by adjusting the voltage of the voltage controlled oscillator 34 to generate the mixer waveform 32 in a series of frequency steps which span the bandwidth available to the system. The entire available bandwidth is swept, numeral 102. The frequency step size is preferably equal to one-half the filter's bandwidth and the dwell time at each frequency position is sufficient to obtain a low variance estimate of the total signal power received at that frequency.

Figure 6:
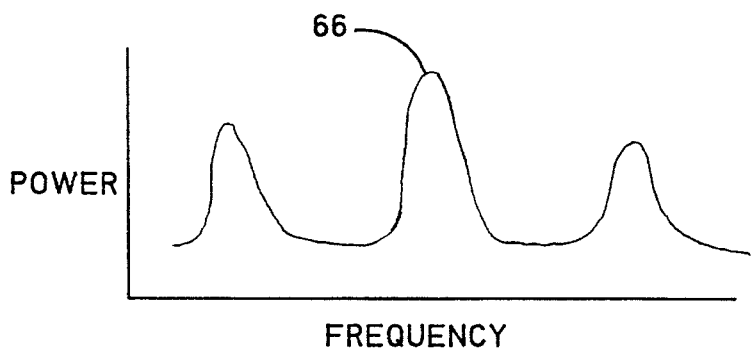
FIG. 6 is a graph of a power spectrum of a transmission channel.

At each frequency, the total power in the received baseband signal is measured, numeral 104. To determine the total power transmitted in each frequency band sample, the output of the controllable digital filter 50 is resampled to the appropriate Nyquist rate and converted to a total power estimate by summing the squares of the signal samples. The value of the power received at each frequency is stored in the microprocessor. The spectral sweep 102 and power determination 104 may be repeated as many times as necessary to build a statistical base, with the results of all of the sweeps digitally averaged by a digital integrator. At the completion of the sweeps and power determination, the microprocessor 65 holds a power spectrum of the broadband of the system. This power spectrum contains one or more peaks 66 indicating the transmission of the corresponding signals available to the receiver. FIG. 6 illustrates such a power spectrum.

Figure 7:
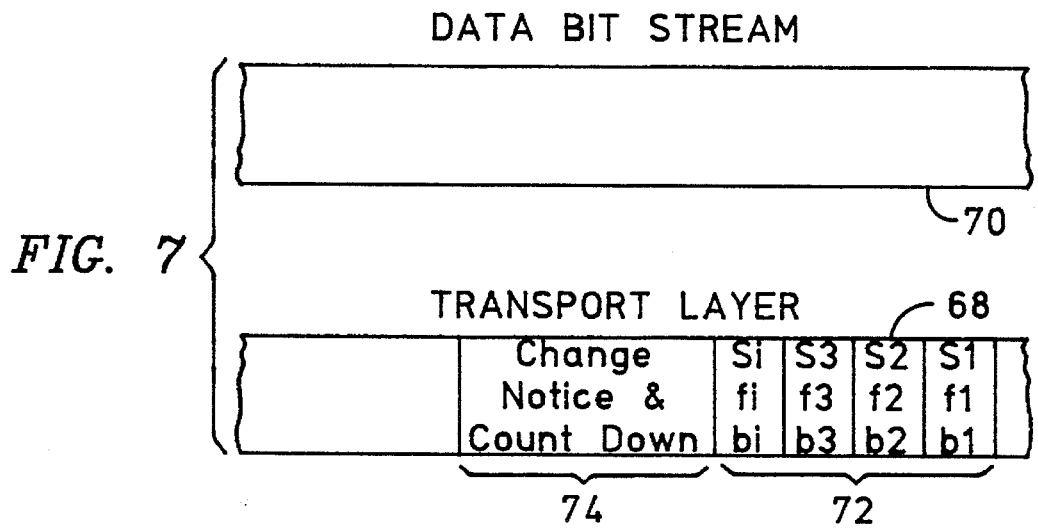
FIG. 7 is a schematic representation of a header found in the data stream of each signal transmitted within a transmission channel.

The receiver 20 is tuned to the center frequency of any one of the signal peaks 66, numeral 106, preferably one of strong power indicating a clear signal available for decoding. A symbol bit stream is established by the normal processing discussed previously. As illustrated in FIG. 7, each bit stream contains a transport layer 69 (also termed a "header") of information in addition to the data stream 70. The data stream varies from signal to signal, but the transport layer 68 of each of the signals contains at least a menu 72 of all of the signals, corresponding to each of the spectral peaks in FIG. 6.

Each menu 72 of each signal contains a listing of each of the available i signals $S_i$ and their respective center frequencies $f_i$ and bandwidths $b_i$. Thus, for example, if the receiver happened to select signal $S_2$ in step 106, the menu of all signals $S_i$ is read from the transport layer 68, numeral 108. If the microprocessor 65 determines from the menu that the signal of interest is in fact signal $S_3$, the frequency $f_3$ and bandwidth $b_3$ are read from the menu 72. The tuner and receiver are immediately reconfigured to the frequency $f_3$ and bandwidth $b_3$ to complete the startup, numeral 110.

In a typical case, it is estimated that the signal acquisition is completed in about 100 milliseconds from startup.

After startup, the receiver 20 is operated to respond automatically to changes in the transmission parameters of the signal in the following manner. During receipt of the symbol bit stream of a signal, the transport layer 68 is continuously monitored by the microprocessor 65, numeral 112. In the event that the service supplier that provides the signal being monitored decides to change a transmission parameter such as the center frequency, the bandwidth, the symbol frequency, or other parameter, information indicating the planned change is encoded into a change block 74 of the transport layer 68. The change block 74 typically would include the old parameters, the new parameters, and a countdown timer to the initiation of the new parameters. The microprocessor 65 counts down to the initiation of the new parameters, numeral 114. At the time of the change to the new signal parameters, the microprocessor 65 instantaneously reconfigures the receiver to the new parameters, numeral 116. With this advance warning of the transmitting parameter change, the changeover is made in a seamless manner. Continuous monitoring of the transport layer 68 also provides information on other signals and their transmission changes, for use when the receiver is switched to a different signal. Switches and changeovers could be made instead by repeating the initiation procedures 102–110, but this would necessarily involve some loss of signal until the new signal parameters were determined.

Figure 8:
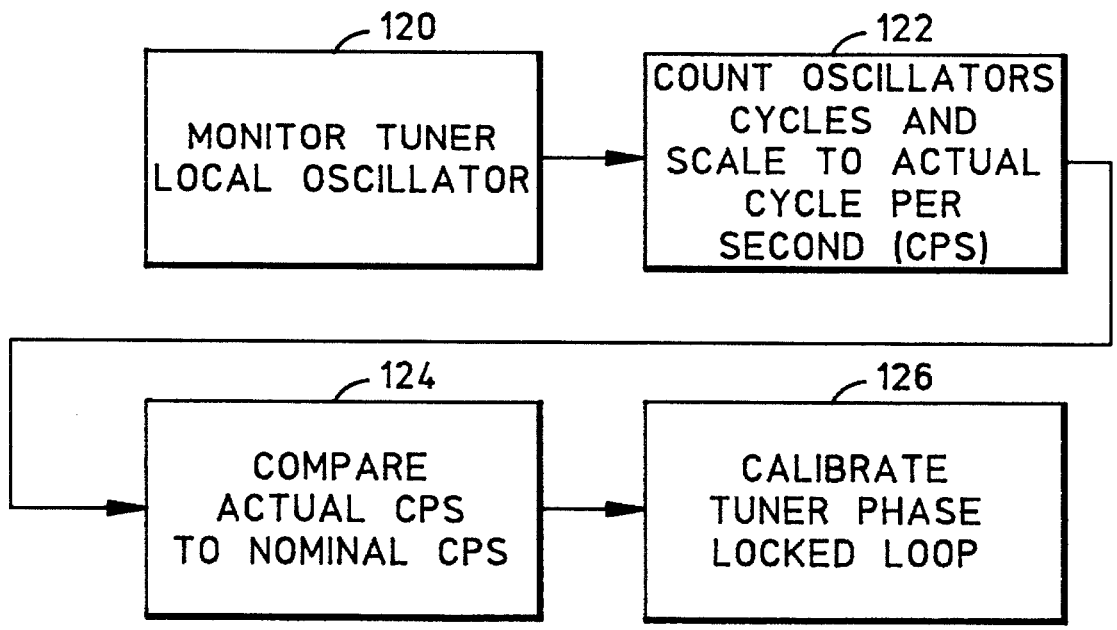
FIG. 8 is a block flow diagram of a self-compensation of the receiver for thermal drift of a local oscillator.

The intelligence provided to the receiver 20 by the microprocessor 65 also is used to advantage in performing test and calibration procedures of the receiver. As an example of the calibration function, the receiver 20 can instantaneously self-compensate for temperature changes that alter the frequency of an oscillator. As shown in FIG. 8, the microprocessor 65 monitors the frequency of the local oscillator of the tuner 24, numeral 120. The frequency is determined by counting the oscillator cycles for a fixed period of time, and converting the number of counts per interval into an oscillator actual cycles per second, numeral 122. The actual oscillator cycles per second is compared to a nominal value, numeral 124. The difference, a calibration for thermal drift or other variation of the tuner oscillator, is provided to the time position-locked loop of the tuning control, numeral 126.

RECEIVER SECOND EMBODIMENT

Figure 9:
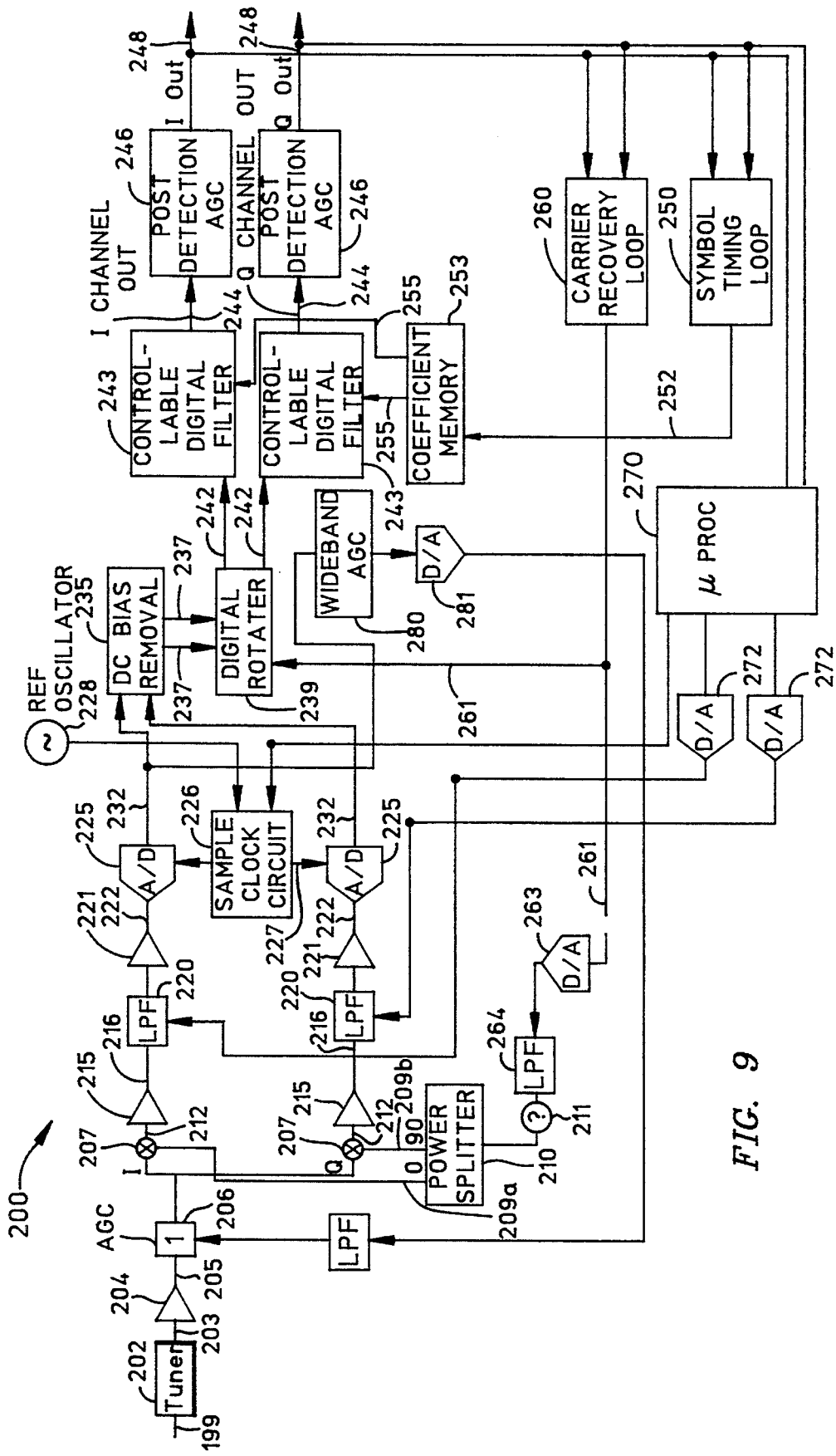
FIG. 9 is a block diagram of a second embodiment of the front end and demodulator of the receiver of FIG. 1.

FIG. 9 is a block diagram of a second embodiment of the digital receiver 200. A transmitted analog signal 199 is received by a tuner 202. The received analog output signal 203 of the tuner is buffered at 204 and the buffered analog signal 205 is amplified by a variable gain amplifier 206 to an amplitude suitable for subsequent signal processing.

The I and Q components of the buffered, amplified analog signal are separately processed in parallel as shown in FIG. 9. In this description, these components may be referred to as the "I channel" and the "Q channel", respectively. The processing is the same in each parallel path, and the following description applies to each of the paths. The buffered, amplified signal is provided to a detector/mixer 207 as a first input. A second input is a mixer waveform provided by a power splitter 210 that splits a local oscillator waveform generated by a voltage controlled oscillator (VCO) 211 into in-phase and quadrature phase mixing components 209a and 209b, respectively. The output of the detector mixer 207 is a modulated signal 212 that contains transmitted information, in this case, a stream of symbols. The modulated signal 212 may be at baseband or in a particular passband, as required by system design considerations.

The modulated signal is buffered at 215 and, still in analog form, is filtered by a low-pass filter (LPF) 220 that acts as an anti-aliasing filter for subsequent signal processing. The bandwidth and out-of-band attenuation of this filter 220 is selectable. The filtered signal output by the low-pass filter 220 is buffered at 221 to provided a filtered, buffered modulated signal 222 that is digitally sampled by means of an analog-to-digital (A/D) converter 225.

The A/D converter 225 is conventional in all respects and quantizes the filtered, buffered modulated analog signal 222 at a fixed sampling rate established by a sample clock circuit 226. The sample clock circuit 226 generates an unchanging sample clock 227 that is established by control input 229 and derived from the output of a reference oscillator 228. Therefore, the analog-to-digital converter 225 samples at a fixed, constant sampling rate. As with the first embodiment, there is no relation between the sampling rate established by the sample clock circuit 226 and any information rate in the modulated portion of the baseband signal. The output of the analog-to-digital converter 225 is a sampled modulated signal 232 that includes a first sequence of digitized samples that occur at the sampling rate.

Prior to resampling the first sequence of digitized samples, DC bias that is an inherent artifact of the quantization performed by the analog-to-digital converter 225 is removed from the first sequence of digitized samples by a DC bias removal circuit 235. The DC bias removal circuit 235 produces a bias-corrected first sequence of digitized samples, which is fed to a digital rotator 239 that is used to perform the fine portion of the acquisition process. The fine portion of the acquisition process assumes that the center frequency of a desired channel has been identified and coarsely acquired through a coarse acquisition loop that sets the frequency of the voltage controlled oscillator 211. Once the desired channel has been coarsely acquired, the digital rotator 239 is swept across a region of frequency uncertainty centered on the coarsely acquired channel's center frequency until carrier and symbol timing lock are achieved.

It is important to place the DC bias removal circuit 235 prior to the digital rotator 239 in the digital receiver 200. This combination avoids shifting the quantization noise artifacts upwardly in frequency in the digital rotator 239, which would degrade the quality of the subsequently-processed signal. The digital rotator 239 corrects frequency and phase characteristics in the first sequence of digitized samples, providing the first sequence as a sequence of frequency- and phase-corrected digitized samples 242.

The first sequence digitized samples is then fed as an input to a controllable digital filter 243 that preferably combines a multirate polyphase filter with a matched filter that is referenced to transmitter waveforms and bandwidths. The controllable digital filter 243 responds to a filter configuration signal and produces an output 244 of a second sequence of digitized samples that occur at a symbol rate, the output 244 representing a symbol stream. The output 244 is level-controlled by a post-detection automatic gain control (AGC) circuit 246 that provides an appropriately scaled and leveled sequence of digitized samples 248 ($I_{out}$ and $Q_{out}$).

The scaled and leveled sequence of digitized samples 248 is provided as the input to the decoder 12 of FIG. 1 for decoding according to known methods. The output of the scaled and leveled sequence of digitized samples is also provided to a symbol timing loop 250 and a carrier recovery loop 260. The symbol timing loop 250 includes a second order digital loop filter with a symbol phase accumulator operating at the sample clock rate, with phase and frequency adjustments occurring at the symbol rate. The symbol timing loop 250 outputs the filter configuration signal as a sequence of coefficient memory addresses 252 that cycles through the addresses of a coefficient memory 253. The coefficient memory 253 provides matched filter coefficients to the controllable digital filter 243, enabling the filter 243 to filter each sample of the first sequence of digitized samples 242 through a polyphase matched filter one symbol or more in length. In this embodiment the filter is eight symbols long. The symbol timing loop adjusts the inter-address distance in the sequence of coefficient memory addresses in response to changes in the symbol rate. The matched filter coefficients in the coefficient memory 253 are programmable for symbol rates exceeding a range of 45:1; other ranges are possible.

The carrier recovery loop 260 uses the scaled and leveled sequence of digitized samples 248 to drive a digital-to-analog (D/A) converter 263, thereby to control coarse frequency acquisition by setting the frequency of the voltage controlled oscillator 211. The output of the digital-to-analog converter 263 is low pass filtered at 264 to appropriately condition its analog output for application to the input of the voltage controlled oscillator 211. The carrier recovery loop 260 also provides a frequency and phase correction signal 261 that establishes the phase rotation effected by the digital rotator 239 in producing the second sequence of frequency- and phase-corrected digitized samples.

A microprocessor 270 receives the scaled and leveled sequence of digitized samples 248 and the output of a wideband AGC amplifier 280 to produce digital signals, converted by digital-to-analog converters 272 into analog signals that individually adjust cutoff frequencies for the low pass filters 220 in order to assist in acquisition, tracking, and calibration of the digital receiver 200.

Figure 10:
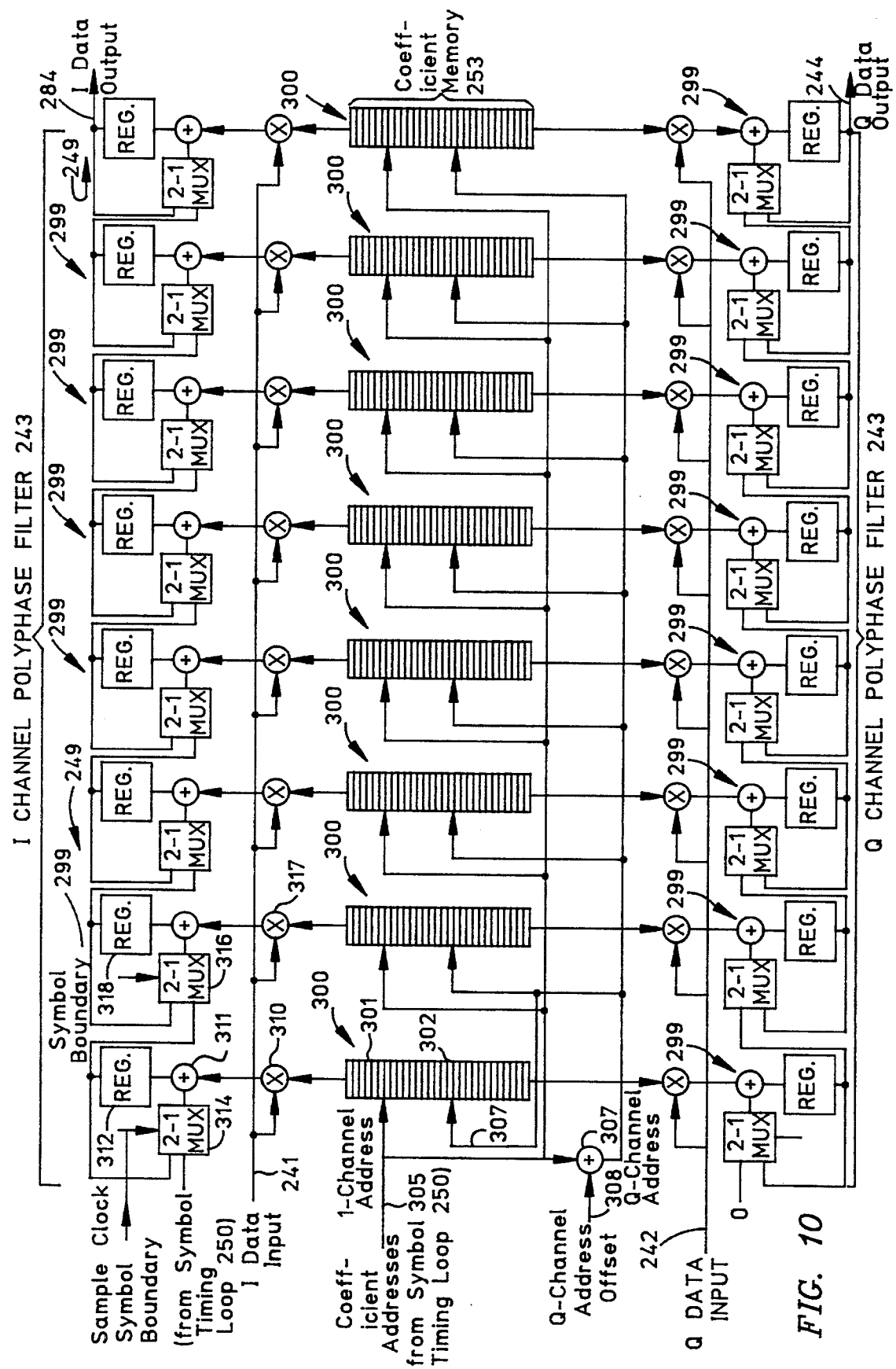
FIG. 10 is a digital schematic diagram of the polyphase filters in the second embodiment demodulator of FIG. 9.

FIG. 10 is a schematic diagram illustrating the architecture of the coefficient memory 253 and the two controllable digital filters 243. For the eight symbol implementation, the coefficient memory 253 includes eight sections 300 of addressable storage. Each addressable storage section 300 may be, for example, a set of sequentially-addressed storage locations in a random access memory (RAM) that can be written to by the microprocessor 270. When addressed, the storage sections provide filter coefficient data to the controllable digital filters 243. Each controllable digital filter 243 includes eight substantially identical accumulator multiplier sections 299 that are linked for serial shifting from left to right in FIG. 10. Each controllable digital filter accumulator multiplier section 299 is connected to receive filter coefficient data from a respective one of the eight addressable storage sections 300. Manifestly, as accumulated values are shifted to the right, the capacities of the registers increase to store numbers of increasing magnitude. Further, the multiplier and adder sizes vary according to the magnitudes of the stored coefficients.

For a clearer understanding, refer once again to FIG. 10 while one of the eight addressable storage sections 300 of the coefficient memory 253 is explained. The addressable storage section 300 includes a plurality of sequentially-addressed memory locations. The storage section 300 is partitioned into halves 301 and 302 which may be accessed through separately addressable output ports in a single memory device. A new coefficient memory address is provided to each half 301 and 302 each period of the sample clock by I coefficient address 305 and Q coefficient address 307. The Q coefficient address 307 is derived by adding an addressing offset 308 to the I coefficient address 305. The addressing offset 308 is supplied by the microprocessor 270.

Each storage location in the upper half 301 includes a filter coefficient for a portion of a finite impulse response (FIR) matched filter. Taken together, the upper halves of all eight addressable storage sections 300 form a sequence of coefficients that define a finite impulse response matched filter. In the second embodiment of the digital receiver, the matched filter is eight symbols long with 32 coefficients per symbol. Thus, each half 301 and 302 has 32 sequentially addressed storage locations, each addressed storage location containing a filter coefficient. Of course, the number of coefficients is a design choice which may be varied to accommodate any particular implementation.

Each accumulator/multiplier section 299 of the controllable digital filter 243 that processes the I channel of the first sequence of digitized samples at 242 is connected to a respective upper half of an addressable storage section 300 in the coefficient memory 253; each section that processes the Q channel is connected to a respective lower half of an address storage section. All of the accumulator/multiplier sections 299 of the controllable digital filters are substantially identical in function, with the understanding that they may vary in size to accommodate numbers of differing magnitudes. Therefore, only the first accumulator/multiplier section of the controllable digital filter 243 that processes the I channel will be explained in detail. The accumulator/multiplier section 299 includes a multiplier 310, an adder 311, a register 312, and a multiplexer 314. This filter will now be referred to as "the I channel controllable digital filter 243". At the input end of the I channel controllable digital filter 243, the first sequence of digitized samples 242 for the I channel is fed at the sample clock rate to the conventional digital multiplier 310. At each sample clock period, a coefficient is provided from the upper portion 301 of addressable storage section 300 to the multiplier 310 which produces a matched filter sample that is added at the digital adder 311 to the contents of the register 312. The contents of the register 312 are read at the sample clock rate and passed through the multiplexer 314 to the adder 311. The register 312, therefore, accumulates a filter value until a symbol clock boundary is reached. When a symbol clock boundary is reached, the state of a multiplexer 316 to which the output of the register 312 is connected changes, passing the contents of the register 312 to the next accumulator/multiplier section including the multiplexer 316, a digital multiplier 317, a digital adder 318, and a register 319. In this manner, accumulated filter values are updated in each filter accumulator/multiplier section 299 at the sample clock rate, but are shifted to the next section 299, or to the output 244, at the symbol clock rate.

Those skilled in the art will appreciate that the controllable digital filter structure illustrated in FIG. 10 provides one filtered, digitized sample at the output 244 for every symbol clock period. Therefore, the output 244 includes the second sequence of filtered, digitized samples that occur at the symbol rate. Each symbol clock period, the second sequence of filtered, digitized samples includes a complex sample having I and Q components that represent a symbol. Consequently, the sequence of filtered, digitized samples that occur at the symbol rate at the output 244 represents a stream or sequence of symbols that may be demodulated from the modulated signal.

Those skilled in the art will further appreciate that, in the case of quadrature modulation schemes that offset the I and Q components in time, a further offset must be introduced to properly position the Q channel coefficient addresses 307 with respect to the I channel coefficient addresses 305.

Figure 11:
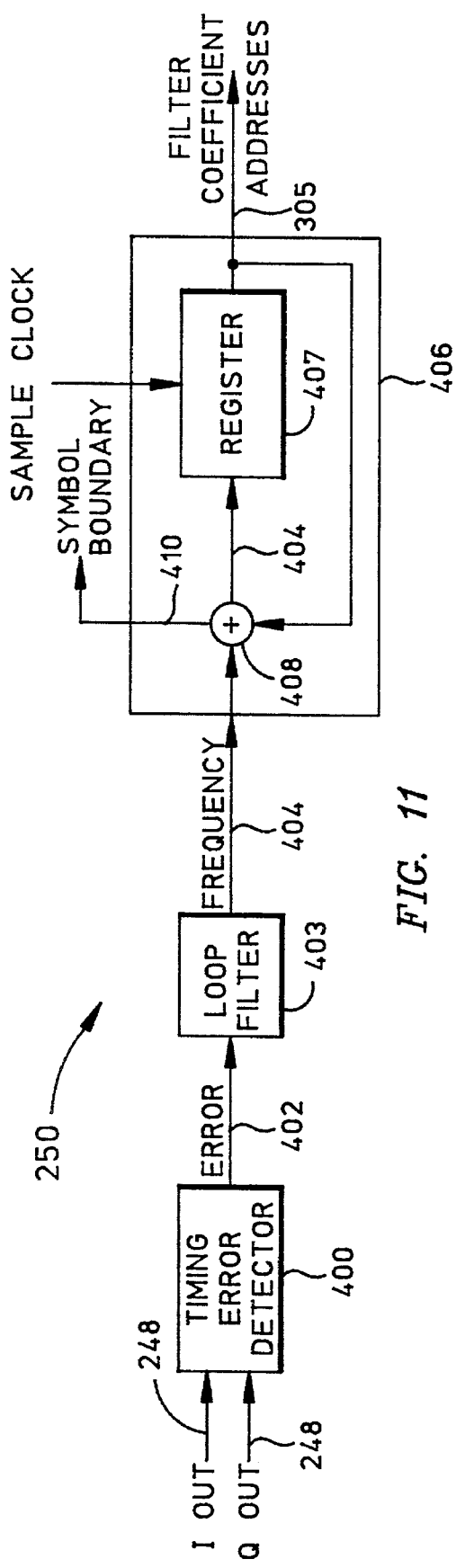
FIG. 11 is a block diagram of a symbol timing loop in the second embodiment demodulator of FIG. 9.

FIG. 11 is a block diagram illustrating the symbol timing loop 250 that generates the filter configuration signal 252 in the form of filter coefficient addresses. The symbol timing loop 250 includes a timing error detector 400, a loop filter 403, and a numerically controlled oscillator (NCO) 406. The timing error detector 400 operates at the symbol rate in response to the scaled and leveled sequence of digitized samples 248, producing a symbol timing error signal 402 that is processed by a loop filter 403 to produce a frequency ratio signal 404. The characteristics of the loop filter 403 respond to the timing error signal, indicative of symbol timing information in the output 248, to produce the frequency ratio signal 404 representing the ratio of the symbol rate to the sample clock rate. This frequency ratio signal, in the form of a digital word, is provided to the NCO 406 as the first input to a conventional digital adder 408. The digital adder 408 receives as a second input the contents of a register 407. Together, the adder 408 and register 407 form a symbol timing accumulator that is incremented at the sample rate by an amount determined by the magnitude of the frequency ratio signal 404. At each sample clock period boundary, the sum 409 produced by the adder 408 is entered into the symbol timing register 407. The most significant bits of the contents of the register 407 are provided as the filter coefficient address 305. For the embodiment utilizing 32 coefficient samples per symbol, the most significant 5 bits of the register 407 are used as the coefficient address. When the sum 409 produced by the adder 408 rolls over the maximum count, the adder 408 produces an overflow signal in the form of a carry bit 410. The carry bit 410 represents the product of the sample clock frequency and the frequency ratio signal 404. Therefore, the overflow signal signifies crossing a symbol boundary on the current sample clock cycle. This is the symbol boundary value provided to the controllable digital filter multiplexers shown in FIG. 10.

A simple timing loop controls resampling of the coefficients stored in the coefficient memory that represent the impulse response of the FIR filter. Effectively, a change in the symbol rate changes the number of resamples that the controllable digital filter takes of the FIR impulse response. This may be understood with reference to FIG. 12, which shows the output of the NCO 406 (FIG. 11) for a symbol rate $F_1$ and a symbol rate $F_2$, where $F_1 = n F_2$, and n need not be an integer.

Figure 12:
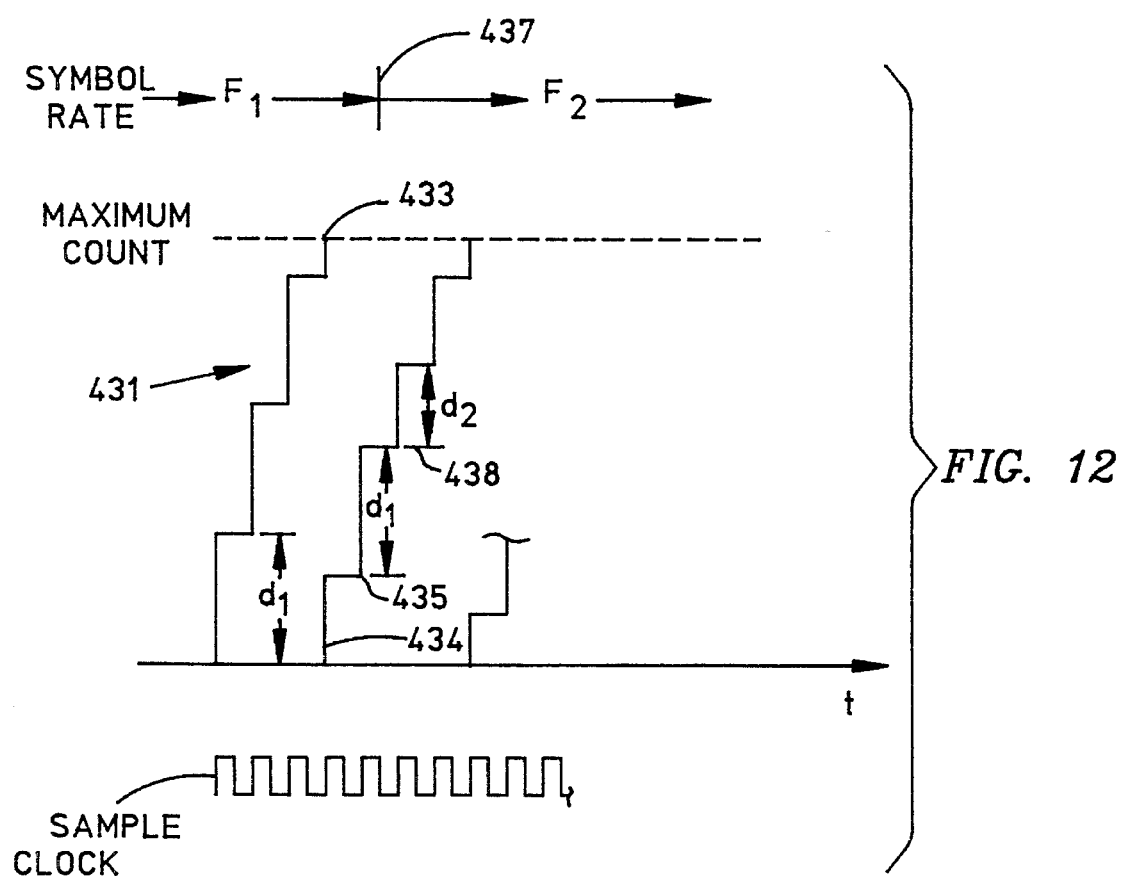
FIG. 12 is a graph of a representation of the operation of the symbol timing loop of FIG. 11 at different symbol rates.

Assume that the symbol rate is initially $F_1$. As shown by the signal waveform 431, the count of the NCO 406 is incremented every sample clock, with $d_1$ representing the amount of the increment. If the increment is enough to change the state of the five bits in the register 407 used for the coefficient address, a new coefficient value is provided from each coefficient memory. A symbol boundary is crossed at 433, at which time, the NCO 406 will assume some initial count at 434. The count increments by $d_1$ at 435, while the symbol rate slows to $F_2$ at 437. The symbol rate change is detected by 400 and 403, and the frequency ratio signal 404 changes from ($F_1$/sample rate) to ($F_2$/sample rate)=($F_1$(n * sample rate)). This causes the NCO 406 to decrease the increment between successive counts to $d_2$, beginning at 438. The result is that smaller increments are made between coefficient addresses as the symbol rate decreases and the coefficients change at a slower rate. Of course, the response of the symbol timing loop is not discontinuous and instantaneous (as suggested by FIG. 12), but rather is slow and smooth. FIG. 12 is only intended to illustrate the effect of symbol rate change on coefficient address generation.

Figure 13:
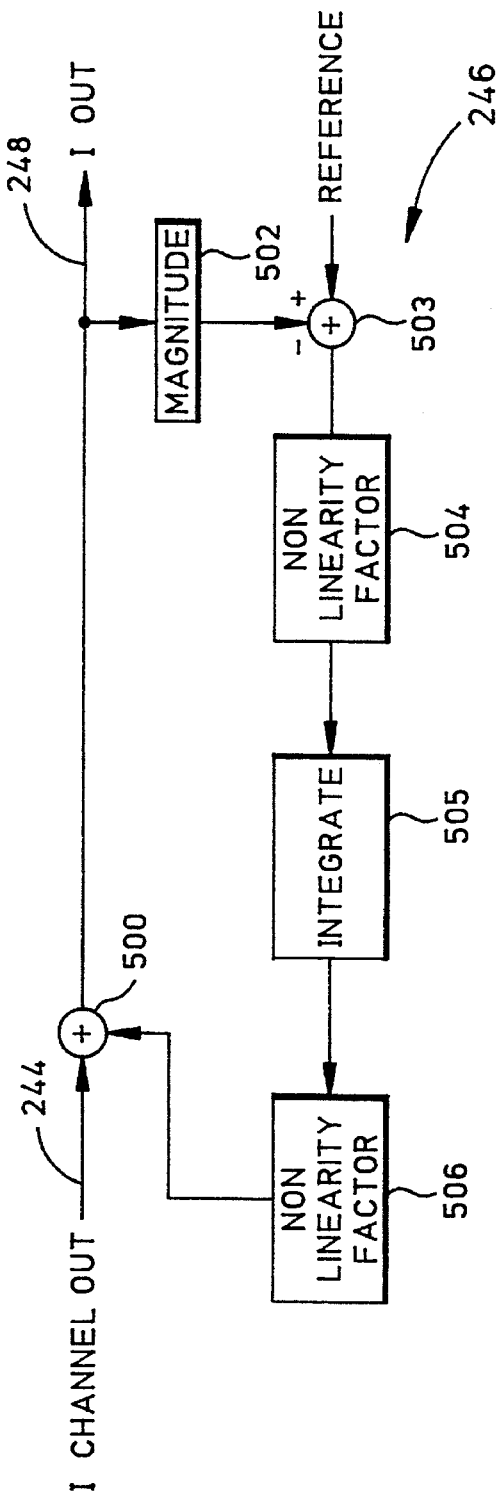
FIG. 13 is a block diagram of a post-detection AGC circuit in the second embodiment demodulator of FIG. 9.

FIG. 13 illustrates, in greater detail, the post detection AGC 246. Post detection AGC 246 receives the second sequence of digitized samples on the output 244 as the input to a conventional digital multiplier 500. The product of the digital multiplier is provided as the scaled and leveled sequence of digitized samples 248 that is output by the digital receiver for decoding. The second input to the digital multiplier 500 is obtained by a gain loop including a magnitude circuit 502, a digital adder 503, a first non-linearity factor circuit 504, an integrator 505, and a second non-linearity factor circuit 506. The magnitude determining circuit 502 receives each sample in the scaled and leveled sequence of digitized samples 248, stripping it of its sign bit and providing the magnitude of the sample as an input to the digital adder 503. The digital adder 503 also receives as an input a gain reference value from the microprocessor 270 and produces a different output that is processed by the first non-linearity circuit 504 and then integrated by the digital integrator 505. The output of the digital integrator 505 is scaled by the second non-linear factor circuit 506 whose output is provided as the other input of the digital multiplier 500. In this manner, the product produced by the multiplier 500 conditions the output 244 by estimating and subtracting a mean value of the sequence and by scaling the range of sample values to match the input requirements of the decoder.

Figure 14:
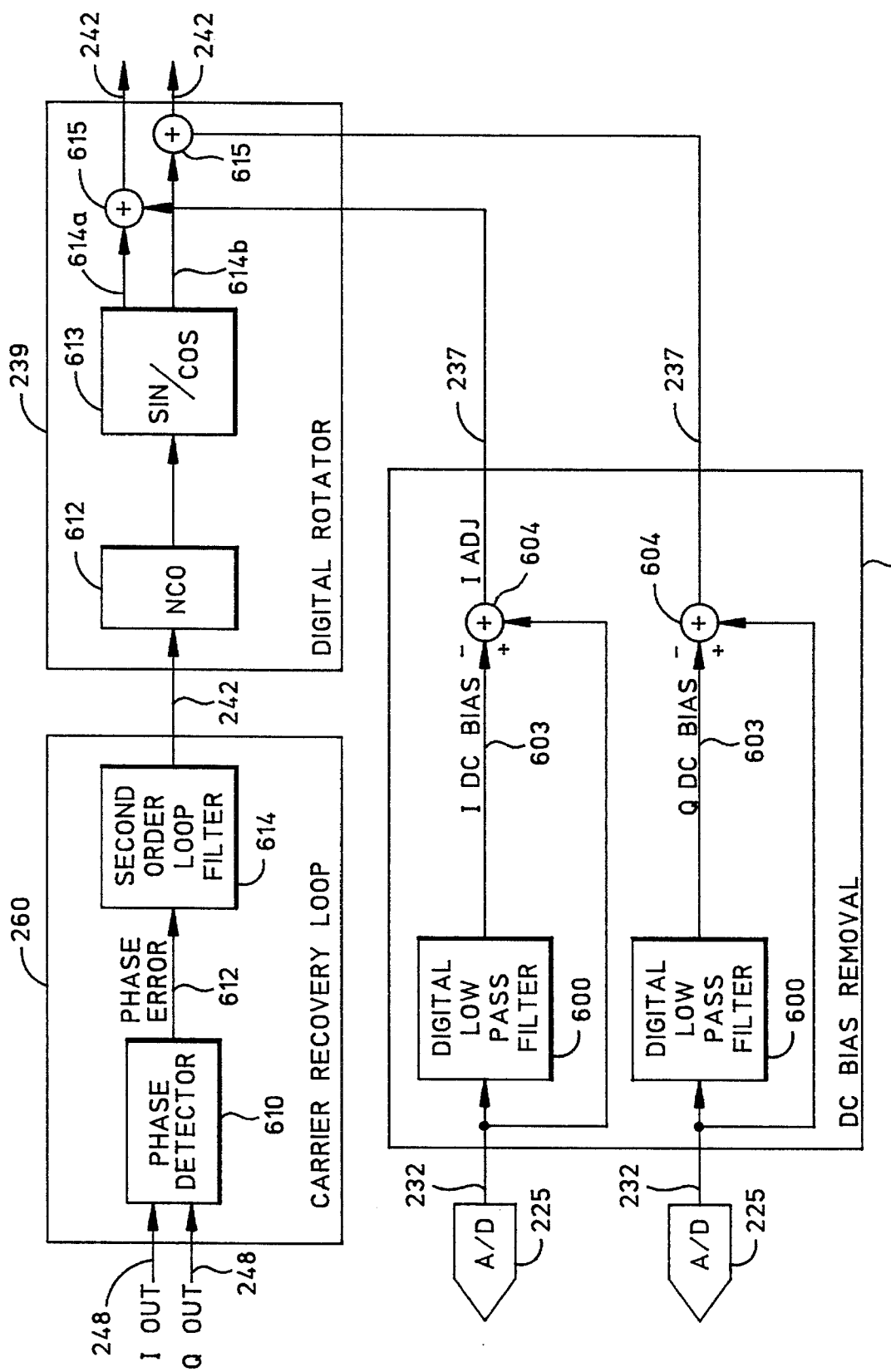
FIG. 14 is a block diagram illustrating the carrier recovery loop, a digital rotator, and a DC bias removal circuit in the second embodiment demodulator of FIG. 9.

FIG. 14 is a block diagram showing, in greater detail, the DC bias removal circuit 235, the digital rotator 239, and the carrier recovery loop 260. The DC bias removal circuit 235 includes two processing paths, one for each for the I and Q channel of the sampled baseband signal 232 included in the first sequence of digitized samples that occur at the sampling rate. A quantizing bias is estimated by providing the first sequence of digitized samples to a digital low pass filter 600 that produces a value indicative of the DC component of the sequence. This value is subtracted from the first sequence of digitized samples by a digital adder 604 that renders the first sequence of digitized samples into a sequence of bias-adjusted digitized samples that are provided to the digital rotator 239.

The carrier recovery loop 260 includes a phase detector 610 having as an input the scaled and leveled sequence of digitized samples 248. The phase detector 610 provides a phase error signal 612 that is filtered by a second order loop filter 614 to produce a fine acquisition value that is provided as the frequency and phase correction signal 261 to the digital rotator 239. The frequency and phase correction signal 261 is received as the input to a numerically-controlled oscillator (NCO) 612 that provides a phase output split into sine and cosine components by the power splitter 613. The power splitter 613 provides a fine frequency and phase adjust signal for the I channel at 614a and for the Q channel at 614b. The bias-corrected first sequence of digitized signals 237 is multiplied by the respective frequency and phase correction factors in the multiplier 615, which produce the second sequence of frequency- and phase-corrected digitized samples 242.

Although particular embodiments of the invention have been described in detail for purposes of illustration, various modifications and enhancements may be made without departing from the spirit and scope of the invention. Accordingly, the invention is not to be limited except as by the appended claims.

I claim:

1. A digital receiver for a transmitted analog signal having an arbitrarily variable data rate, comprising:

a source of a modulated analog signal;

a sampler having an input of the modulated analog signal, the sampler operating at a fixed sampling rate and having an output of a sampled modulated signal including a first sequence of digitized samples at the sampling rate;

a controllable digital filter having a first input of the first sequence of digitized samples and a second input of a filter configuration signal, and an output of a second sequence of digitized samples at a variable symbol rate, the output representing a symbol stream;

the controllable digital filter including matched filter coefficients that enable the controllable digital filter to produce the second sequence of digitized samples by matched filtration of the first sequence digitized samples, wherein the matched filter coefficients are selected by the filter configuration signal; and a timing loop coupled to the controllable digital filter for generating the filter configuration signal and for changing the filter configuration signal in response to a change in the symbol rate, the filter configuration signal being a function of the ratio of the symbol rate to the sampling rate.

2. The digital receiver of claim 1, further including a gain controller having an input of the second sequence of digitized samples and an output of a scaled and levelled sequence of digitized samples at the symbol rate.

3. The digital receiver of claim 1, wherein the source of the modulated signal comprises:

a tuner having the transmitted analog signal as an input and a received analog signal as an output, a demodulator having a first input of the received analog signal and a second input of a mixer waveform, and an output of a baseband signal modulated on the received analog signal, and a low pass analog filter having an input of the baseband signal and an output of a filtered baseband signal comprising the modulated analog signal.

4. The digital receiver of claim 3, further including a voltage controlled oscillator having an input of a voltage control signal and an output of the mixer waveform.

5. The digital receiver of claim 1, wherein the timing loop includes:

a timing error detector having the second sequence of digitized samples as an input and providing a symbol timing error signal as an output;

a loop filter having the symbol timing error signal as an input and a frequency ratio signal as an output, the frequency ratio signal representing a frequency having a magnitude of the ratio of the symbol rate to the sampling rate; and a numerically controlled oscillator having as an input the frequency ratio signal, and an output of the filter configuration signal.

6. The digital receiver of claim 5, wherein the numerically controlled oscillator further produces a symbol boundary signal representing the symbol rate.

7. The digital receiver of claim 6, wherein the controllable digital filter includes:

an addressed array of storage locations containing the matched filter coefficients; and a plurality of sequentially-connected accumulator/multiplier sections, each accumulator/multiplier section being connected to a respective set of addressed storage locations;

wherein the filter configuration signal includes coefficient addresses that are provided to the addressed storage locations.

8. The digital receiver of claim 1, further including a sample clock circuit that provides a sampling clock signal to the sampler.

9. The digital receiver of claim 1, wherein the controllable digital filter is a multistage polyphase filter.

10. The digital receiver of claim 9, wherein the controllable digital filter includes a multistage finite impulse response filter defined by the matched filter coefficients.

11. The digital receiver of claim 1, wherein the sampler includes an analog-to-digital converter.

12. The digital receiver of claim 11 further including a digital rotator coupled to the sampler output and to the controllable digital filter first input for correcting frequency and phase in the first sequence of digitized samples.

13. The digital receiver of claim 12, further including a DC bias removal circuit connected to the analog-to-digital converter and to the digital rotator for adjusting a DC bias introduced into digitized samples of the first sequence of digitized samples by quantization of the baseband analog signal in the analog-to-digital converter.

14. A digital receiver for a transmitted analog signal modulated with a symbol stream having a variable symbol rate, comprising:

a source of a modulated analog signal;

a sampler for sampling the modulated analog signal at a preselected fixed sampling rate to produce a first digital sampler means output including a first sequence of digitized samples at the sampling rate;

a bias remover coupled to the sampler for removing from the first digital sampler means output DC bias introduced into the digitized samples by the sampler;

a controllable digital filter for receiving the first digital sampler means output and producing a filter output, the controllable digital filter also receiving a filter configuration signal in response to selectively variable matched filter coefficients; and means for selectively varying the matched filter coefficients in response to variations in the symbol rate by varying the filter configuration signal, the filter configuration signal being a function of the ratio of the symbol rate to the sampling rate.

15. The digital receiver of claim 14, wherein the means for selectively varying the matched filter coefficients includes:

a symbol timing means for producing a coefficient address signal in response to the variations in the symbol rate; and a coefficient memory connected to the symbol timing means for storing matched filter coefficients at memory locations addressed by the coefficient address signal.

16. The digital receiver of claim 14, wherein the source of the modulated analog signal comprises:

tuner means for receiving the transmitted analog signal and producing a received analog signal;

mixer/translator means for translating the received analog signal to a baseband signal; and low pass analog filter means for filtering the baseband signal.

17. The digital receiver of claim 14, further including means for detecting the change in symbol rate and adjusting the matched filter coefficients in response to the change in the symbol rate.

18. A method for receiving and processing a transmitted signal using a digital receiver with a controllable digital filter including matched filter coefficients that enable the controllable digital filter to produce a sequence of digitized samples, the method including the steps of:

providing modulated analog signal;

sampling the modulated analog signal at a fixed sampling rate to produce a sampled modulated signal including a first sequence of digitized samples at the sampling rate filtering the first sequence of digitized samples in the controllable digital filter to produce a second sequence of digitized samples at a variable symbol rate;

detecting a change in the variable symbol rate;

generating a filter configuration signal in response to the detected change in the symbol rate, the filter configuration signal being a function of the ratio of the symbol rate to the sampling rate; and changing the coefficients of the controllable digital filter in response to the filter configuration signal.

19. The methodology claim 18, further including the steps of:

adjusting DC bias introduced into digitized samples in the first sequence of digitized samples by the sampling steps, followed by, adjusting frequency and phase characteristics of the first sequence of digitized samples before the step of filtering.

20. The method of claim 18 wherein the fixed sampling rate is asynchronous with the symbol rate.

21. The method of claim 18, further including the step of scaling and levelling the second sequence of digitized samples.

* * * * *

UNITED STATES PATENT AND TRADEMARK OFFICE
CERTIFICATE OF CORRECTION

PATENT NO.  : 5,612,975
DATED       : March 18, 1997
INVENTOR(S) : Becker et al

It is certified that error appears in the above-indentified patent and that said Letters Patent is hereby corrected as shown below:

Column 14, line 51 insert --of-- following "sequence".

Column 16, line 29, change "the change" to --a change--;

Column 16, line 37 insert --a-- following "providing";

Column 16, line 53, change "methodology" to --method of--.

Signed and Sealed this

Seventeenth Day of June, 1997

Attest:

BRUCE LEHMAN

*Attesting Officer*   Commissioner of Patents and Trademarks